United States Patent [19]

Ealey et al.

[11] Patent Number: 4,923,302

[45] Date of Patent: May 8, 1990

[54] METHOD AND APPARATUS FOR CALIBRATING DEFORMABLE MIRRORS HAVING REPLACEABLE ACTUATORS

[75] Inventors: Mark A. Ealey, Ayer; Victor G. Salemme, Concord, both of Mass.

[73] Assignee: Litton Systems, Inc., Lexington, Mass.

[21] Appl. No.: 305,671

[22] Filed: Feb. 2, 1989

[51] Int. Cl.⁵ .............................................. G01B 21/20
[52] U.S. Cl. ................................... 356/371; 350/360; 356/376
[58] Field of Search ................. 356/371, 376; 350/360

[56] References Cited

U.S. PATENT DOCUMENTS

| | | | |
|---|---|---|---|
| 3,761,179 | 9/1973 | Plummer et al. | 356/371 |
| 3,821,771 | 3/1975 | Scott | 356/371 X |
| 3,923,400 | 12/1975 | Hardy | 356/354 X |
| 4,645,917 | 2/1987 | Penney et al. | 356/376 X |

*Primary Examiner*—Davis L. Willis
*Assistant Examiner*—Matthew W. Koren
*Attorney, Agent, or Firm*—Michael H. Wallach; Robert F. Rotella

[57] ABSTRACT

An apparatus and method for calibrating deformable mirrors having replaceable actuators are disclosed. The mirror to be calibrated is mounted on an x-y table to permit selective movement of the mirror between an actuator position adjustor means and a sensor probe which senses the extent of deflection of the mirror's reflecting surface. A light source provides a source of illumination for selectively illuminating areas of the reflecting surface in the vicinity of an actuator to be adjusted. A photodetector array receives the reflected light and transmits its output to a controller which computes the distance between the sensor probe and the reflecting surface. The controller may be used to selectively energize the actuator position adjustor means to control the extent that one or more actuators influence the shape of the mirror's reflecting surface.

20 Claims, 3 Drawing Sheets

METHOD AND APPARATUS FOR CALIBRATING DEFORMABLE MIRRORS HAVING REPLACEABLE ACTUATORS

BACKGROUND OF THE INVENTION

1. Field of the Invention

This invention relates to deformable mirrors which have replaceable, electrically operated actuators for deforming the mirror's reflecting surface. The disclosed invention is a method and apparatus for installing and adjusting the actuators to control the surface shape of the mirror's reflecting surface.

2. Summary of the Prior Art

It is well known in the prior art to use deformable mirrors to correct optical signals for aberrations introduced into a wavefront due to the transmission of an optical signal through a distorting medium, e.g. the earth's atmosphere. Such deformable mirrors may be used, for example, to correct aberrations introduced into laser signals or optical images imaged by a telescope as they pass through the earth's atmosphere, or to introduce known aberrations into a laser signal prior to its transmission through the earth's atmosphere. Examples of deformable mirrors which may be used to perform the foregoing function appear in U.S. Pat. Nos. 3,904,274 and 4,657,358 which are owned by the assignee of the present invention and the teaching's of which are incorporated herein by reference. Mirrors of the foregoing type employ a plurality of actuators, for example piezoelectric actuators, which are independently operable to selectively deform areas of a deformable reflecting surface to correct known anomalies contained in an impinging optical signal's wavefront. Signals for driving the actuators to correct the aberrated wavefront may be provided by a wavefront sensing and correction system such as that described in U.S. Pat. No. 3,923,400, the teachings of which are also incorporated herein by reference.

The use of wavefront control systems, for example deformable mirrors, in large aperture optical systems mandates the use of a large diameter mirror to achieve effective wavefront control. Additionally, such a system should ideally also contain a large number of closely spaced actuators to permit adjustments to be made at locations closely spaced together across the deformable mirror's reflecting surface. To accommodate the foregoing requirements, a deformable mirror will frequently require the use of a large number of actuators to achieve effective control of the mirror's reflecting surface.

As noted in U.S. Pat. No. 4,657,358, actuators for use in controlling a deformable mirror may be manufactured from stacks of electrodistortive material, for example lead magnesium niobate (PMN) or lead zirconate titanate (PZT). The electrodistortive material is interleaved in the stack with alternating layers of electrical conductors to permit the application of an electrical signal to the material.

Prior known deformable mirrors which utilize stacked electrodistortive material to provide control of the mirror's reflecting surface have been constructed with the actuators rigidly fastened to the structure supporting the mirror's reflecting surface, for example by cement or a frit bond. Such construction has not provided for the ease of repair of a deformable mirror in the event of a failure of one or more actuators. In the event of the failure of an actuator due, for example, to the mechanical failure of an actuator or to the failure of electrical contacts between one or more layers of electrodistortive material, the components of the mirror had to be carefully disassembled to effect the removal and replacement or repair of the failed actuator. Such a disassembly procedure is time consuming, frequently difficult and often impossible to effect due to the spacing between adjacent actuators and the need to prevent damaging good actuators during the repair procedure. Consequently, there is a need for a deformable mirror which utilizes electrically operated actuators which may be easily replaced without damaging other actuators during the replacement procedure. A related requirement is for a deformable mirror having replaceable actuators which may be easily adjusted during the replacement procedure to control their influence on the deformation of a deformable mirror's reflecting surface.

In a related patent application owned by the owner of the present patent application and the teachings of which are incorporated herein by reference, a construction for a deformable mirror is disclosed in which the mirror's electrodistortive actuators may be easily removed from the mirror's base or support structure for purposes of calibrating and/or replacing one or more of the mirror's actuators. Each actuator may include a threaded portion which may be received in a threaded aperture in the base. The position of each actuator with respect to the mirror's deformable reflecting surface may be adjusted by screwing the actuator into its threaded aperture until the top of the actuator just contacts the structure supporting the reflecting surface without deflecting the surface. Further adjustment of the position of each actuator with respect to the mirror's reflecting surface may be used to control the initial (or rest) shape of the mirror's reflecting surface.

While a mirror constructed utilizing replaceable actuators as described above has the advantage of permitting the replacement and/or alignment of one or more of the mirror's actuators, it suffers from the requirement that each actuator must be precisely adjusted within its respective aperture to insure that the mirror's reflecting surface does not contain any deformations caused by improperly positioned actuators. Consequently, the actuator adjustment procedure is tedious, and must be carried out when the mirror is initially assembled and each time that an actuator is replaced. The actuator alignment procedure is both time consuming and requires careful measurement of the mirror's reflecting surface to insure a uniform reflecting surface so that there is preferably less than 1/10 wave difference at the frequency of the light to be reflected from the reflecting surface across the mirror's reflecting surface.

SUMMARY OF THE INVENTION

Accordingly, a principal object of this invention is to provide a mechanism which will permit automatic adjustment of the position of electrodistortive actuators in a deformable mirror so that each actuator is properly positioned with respect to the mirror's deformable reflecting surface.

Another object is to provide a mechanism for the automatic adjustment of electrodistortive actuators which requires a minimum amount of human operator intervention.

A further object is to provide a mechanism for quickly replacing one or more actuators in a deformable mirror without degrading the quality of the mirror's reflecting surface.

Still another object is to provide a method for the automatic adjustment of adjustable actuators during either their initial installation or replacement in a deformable mirror to insure that no surface anomalies of more than 0.1 μm appear across the deformable mirror's reflecting surface.

Another object is to provide optical monitoring of surrounding actuators such that many channels can be installed during the same run.

Another object is to provide optical processing of the position of actuators such that the process is capable of handling and monitoring the optical quality of a deformable mirror having several hundred or more actuators.

The foregoing and other objects and advantages of the invention are achieved by a mechanism which allows the accurate measurement of distances between various locations on the reflecting surface of the deformable mirror and a fixed datum. An optical displacement sensor is suspended over the deformable mirror while the mirror is clamped onto the moveable bed of an x-y table. The x-y table includes means for moving the mirror beneath the optical displacement sensor in small increments, typically on the order of 1 cm per step in x and y directions. The optical displacement sensor includes means for directing one or more sources of light onto the mirror's reflecting surface and means for receiving the light reflected from the reflecting surface. The mechanism relies for its operation on the well known principle that the intensity of light is inversely proportional to the distance between the light source and the receiver of the light. One or more photodetectors are used to measure the light reflected from one or more areas on the mirror's reflecting surface. The electrical output of the photodetectors are proportional to the distance between the optical displacement sensor and areas on the reflecting surface beneath each light receiver. The apparatus includes an actuator position adjustment mechanism located in the x-y table beneath the optical displacement sensor to selectively engage an actuator and rotate it within each actuator's threaded aperture in the deformable mirror's base. Movement of the actuators against the mirror's facesheet controls the shape of the mirror's reflecting surface. A controller is connected to the output of the photodetectors and is used to selectively engage the actuator position adjustment mechanism to each actuator and to sequentially rotate one or more of the actuators while monitoring the output of the photodetectors to impart the desired shape to the reflecting surface.

BRIEF DESCRIPTION OF THE DRAWINGS

The above objects and other advantages of the invention will be appreciated after review of the detailed description of a preferred embodiment when read in conjunction with the drawing in which:

FIG. 6 is a an end view of a fiber optic probe which may be used to measure the displacement at locations across a deformable mirror's reflecting surface.

DETAILED DESCRIPTION OF A PREFERRED EMBODIMENT

Figure 1:
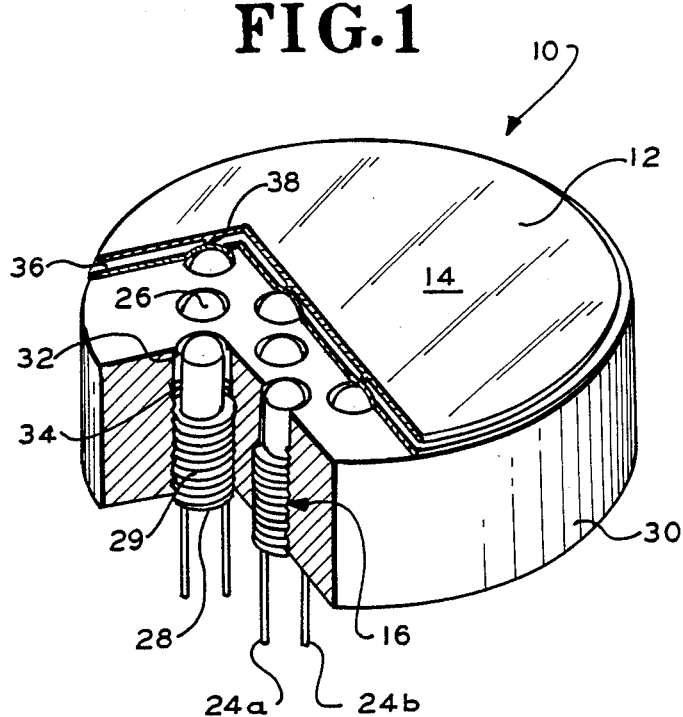
FIG. 1 is a perspective view partially in section of a deformable mirror having replaceable actuators for deforming the mirror's reflecting surface.
Figure 2:
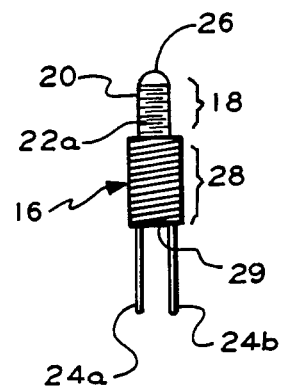
FIG. 2 shows an actuator which may be used to selectively deform the mirror's reflecting surface.
Figure 3:
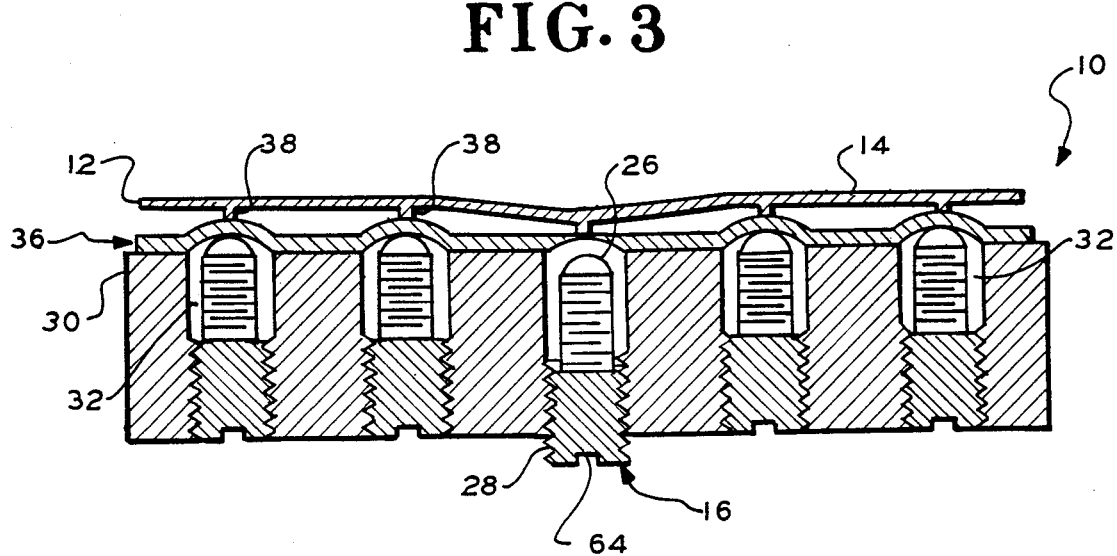
FIG. 3 is a side view of the deformable mirror of FIG. 1.

Referring to the drawing, FIG. 1 shows a deformable mirror 10 having replaceable actuators which may be adjusted using the method and mechanism of the invention. The mirror 10 includes a facesheet 12 having a mirrored surface 14 for correcting aberrated optical signals reflected therefrom, for example laser signals or images from an optical telescope which have become distorted in passing through the atmosphere. Preferably, the facesheet 12 is manufactured from a material which may be polished to form the reflecting surface 14 and which may be deflected by the selective operation of one or more actuators 16. As shown in FIG. 2, each actuator 16 includes a body portion 18 which is comprised of a plurality of layers 20 of electrodistortive material, for example lead magnesium niobate (PMN) or lead zirconate titinate (PZT). Interleaved between the layers 20 are alternating layers 22a and 22b of electrical contacts to permit electrical signals to be applied to the layers 20. Thus the layers 20 are connected to each other mechanically in series and electrically in parallel. The contacts 22a and 22b are connected through control electronics to a controlled D.C. source of voltage (not shown) through the leads 24a and 24b. The top of each actuator 16 includes a conical pushrod 26. Each actuator 16 includes a lower or plug end 28 used to support the body portion 18 of the actuator i.e., the portion of the actuator which elongates in response to the application of an electrical signal thereto. The plug end 28 may be separately manufactured, from Invar for example, and then bonded to the lower end of the actuator's active layers. The plug end also contains an aperture (not shown) to permit the leads 24a and 24b to be connected to the control electronics. Each plug end 28 contains a threaded portion having threads 29 on its outside surface.

FIG. 1 shows that the deformable mirror 10 includes a base 30 which is preferably manufactured from a material which has a low coefficient of thermal expansion, for example Invar or silicon. The base 30 includes a plurality of apertures 32 passing therethrough, each of which may contain an actuator 16. The apertures 32 each include a threaded portion 34 which is sized to receive the mating threads 29 on the plug end 28 of each actuator 16. Preferably, the pitch of the threads 29 on the plug end 28 of each actuator 16 are sufficiently fine to permit precise control of the position of each actuator 16 with respect to the facesheet 12 as each actuator 16 is screwed into its aperture 32, for example 40 or more threads per inch. The deformable mirror 10 includes a retraction membrane 36 which acts as a mechanical spring to place each actuator under a compressive load at all times and to retract the facesheet 12 to its undeformed position when electrical signals are either reduced or removed from one or more of the actuators 16. The retraction membrane 36 serves as an electromechanical interface between the actuators 16 and the facesheet 12. The retraction membrane 36 also serves the further function of maintaining intimate contact between each of the actuators 16 and the facesheet 12, even during high frequency, high amplitude operation of the mirror. The retraction membrane 36 permits the use of replaceable actuators 16 such as those disclosed in related patent application Ser. No. 266,616 filed Nov. 3, 1988 since the actuators 16 are not required to be mechanically fastened to the facesheet 12.

The retraction membrane 36 is fastened to the base 30 by bonding the membrane 36 to the top surface of the base 30, for example by using a frit bond or structural adhesive. Preferably the bond exists at all locations between the top surface of the base 30 and the bottom surface of the membrane 36, including the areas between the apertures 32. The retraction membrane 36 is manufactured from a material which has a high coefficient of thermal conductivity, a low coefficient of thermal expansion, and which may be flexed by local forces imparted by the elongation of the actuators 16 while having sufficient elasticity to permit retraction of the facesheet 12 by the membrane 36 at locations in which electrical signals to one or more actuators 16 are reduced or removed. Preferably the retraction membrane 36 is designed with a gradient stiffness to distribute stress over a greater area surrounding each actuator 16. Locations on the membrane 36 which are to be acted upon by actuators 16 are contoured by machining and/or acid etching, for example, to provide a variable thickness, and hence stiffness, at locations surrounding the point at which the center of the end 26 of each actuator 16 contacts the membrane 36.

The rear surface of faceplate 12 includes the pusher pads 38 which may be either formed as a part of the facesheet 12 or separately fabricated and then bonded thereto. The facesheet 12 is bonded to the retraction membrane 36 at the pusher pads 38 using, for example, a frit bond or a structural adhesive. Pusher pads 38 are each located on the faceplate 12 over the locations at which each actuator 16 would apply pressure to the faceplate 12 and serve to transfer compressive and tensile forces from the retraction membrane 36 into the facesheet 12. Thus, forces generated by the operation of the actuators 16 are transferred through the retraction membrane 36 into the facesheet 12.

Preferably a deformable mirror constructed in accordance with the foregoing description is assembled by first bonding a retraction membrane 36 having parallel top and bottom surfaces to the base 30 prior to the installation of any actuators 16. Thereafter, the actuators 16 are threaded into each of the apertures 32 and are screwed up against the retraction membrane 36 to deflect the membrane upward. A bias voltage is then applied to each of the actuators 16 to cause the further upward deflection of the retraction membrane 36. The facesheet 12 is bonded onto the retraction membrane 36 at the pusher pads 38 while the actuators 16 continue to be biased by the applied electrical signal. The surface 14 of the facesheet 12 is then polished to produce a flat reflecting surface while the actuators 16 are being biased against the membrane 36 by the applied electrical signal.

It will be evident to those skilled in the art that a deformable mirror such as shown in FIG. 1 could require one thousand or more actuators if the mirror is designed for use in a large aperture optical system and/or if the system is required to provide highly accurate control of very small incremental areas of the mirror's reflecting surface. For example, it is not unreasonable to expect that a system will require actuators spaced less than 1.0 cm apart from each other. In an optical system having an aperture of 0.5 meters, such a degree of surface control would require 2,300 or more actuators. For a 1.5 meter system, the number of active actuators wold exceed 10,000. Obviously, a substantial effort would be required to install and align such a large number of closely-spaced actuators to insure that the installed actuators produced a planar reflecting surface. Consequently, it would be advantageous to have a system available which performed an automatic alignment of individual actuators to insure the correct alignment between each actuator and the mirror's reflecting surface. Such a system would be beneficial to have for both the initial setup of the mirror, i.e. when the actuators are first installed in the mirror's base, and when it becomes necessary to replace a defective actuator.

Figure 4:
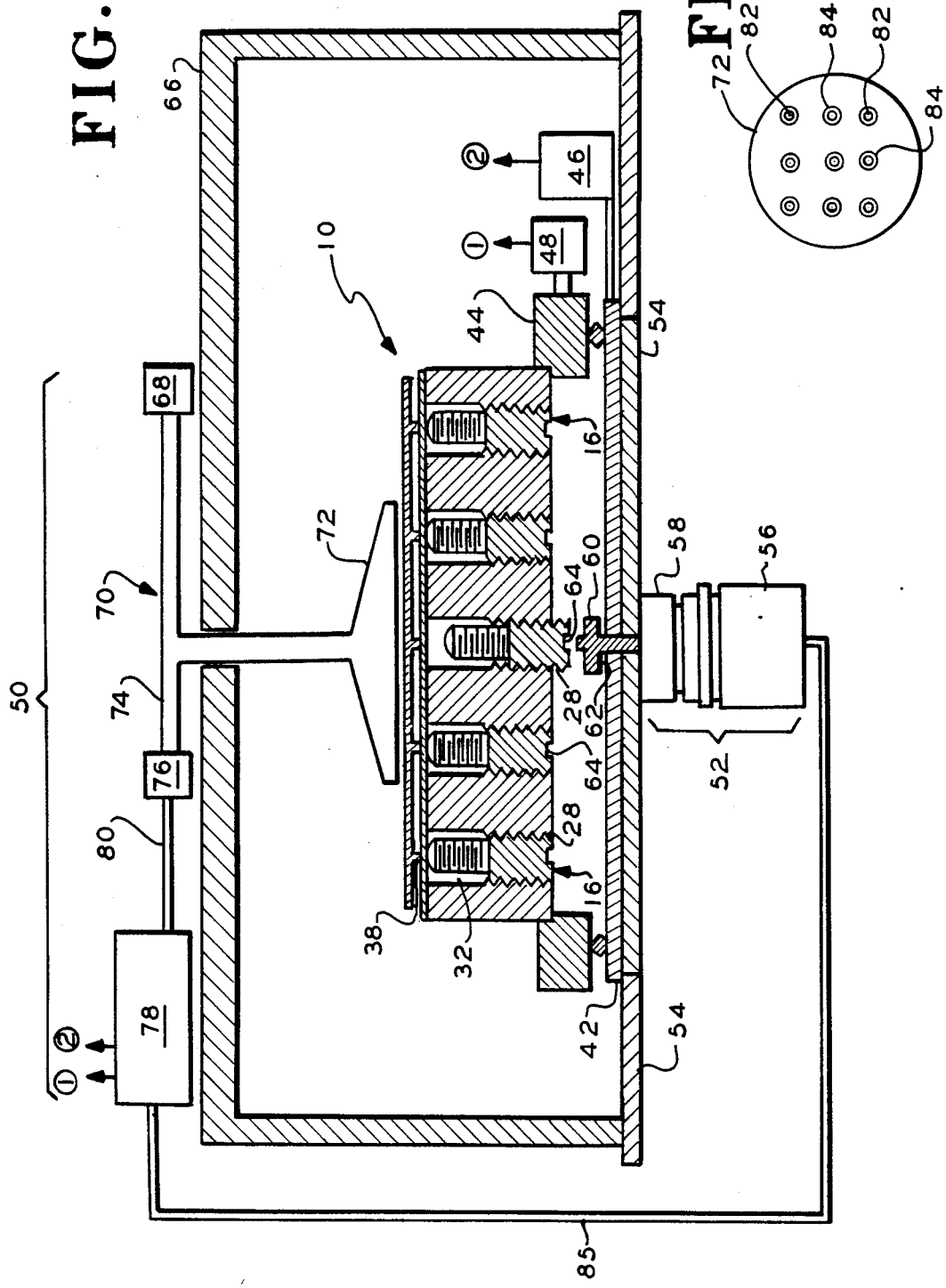
FIG. 4 is a side view in section of an automatic calibration mechanism which may be used to automatically adjust the position of actuators in the base of a deformable mirror.
Figure 5:
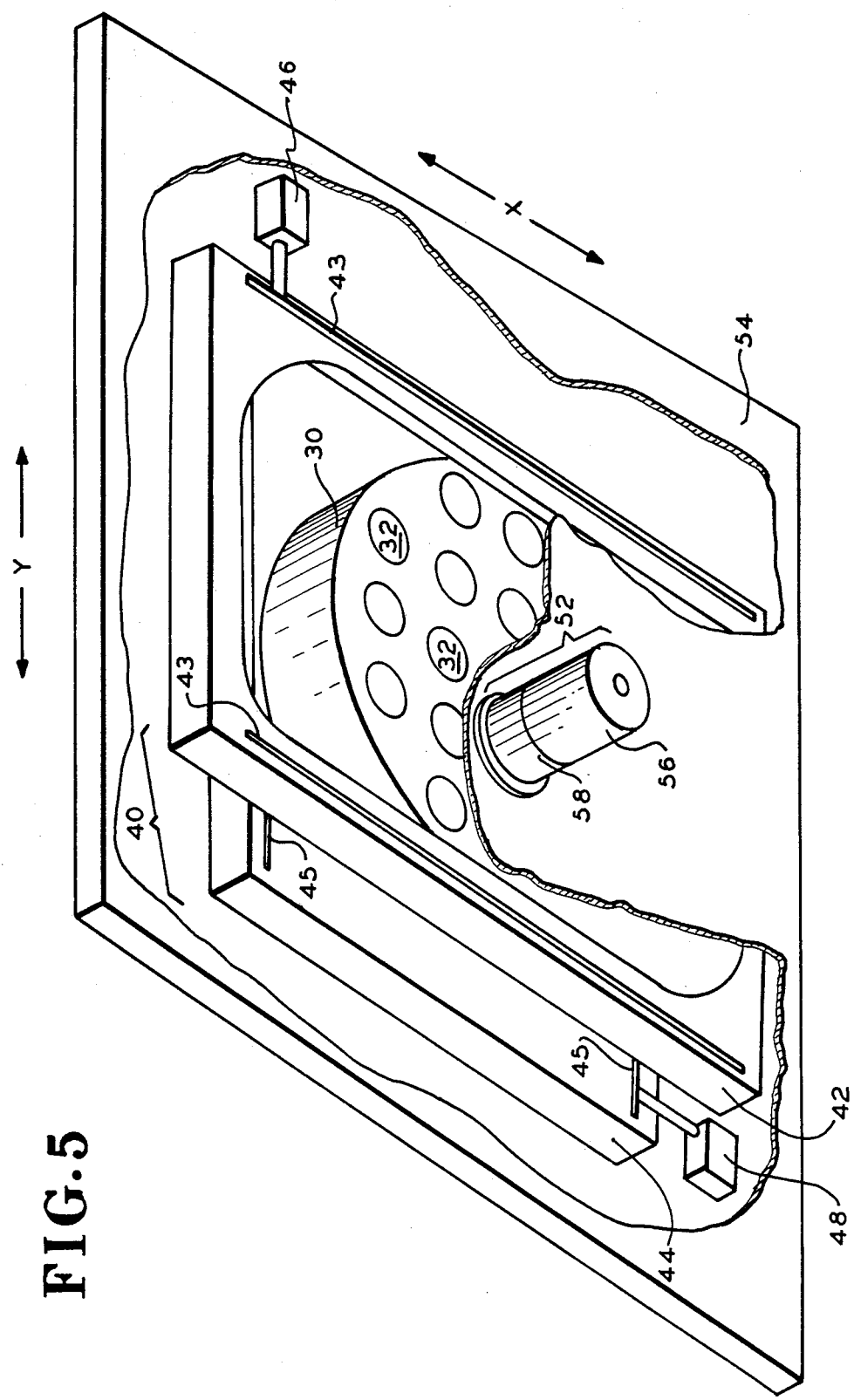
FIG. 5 is a perspective view of the underside of a positioning apparatus which may be used to selectively align a rotary positioning tool behind an adjustable actuator.

FIGS. 4 and 5 illustrate a system which may be used to perform the actuator adjustment described above. The system includes means for securing and moving the deformable mirror 12 which is generally shown at 40. Preferably such means include an x-y table, for example a Daedal open frame linear x-y table, having a frame 42 to selectively move the mirror 12 along an x-axis on tracks 43 and a frame 44 to selectively move the mirror along a y axis on tracks 45. Frame 42 may be driven by a driver 46, for example a precision stepper motor, and frame 44 may be driven by a similar driver 48. Frames 42 and 44 permit the precise movement of the mirror 10 in x and y directions between an optical displacement sensor system 50 suspended above the mirror and an actuator position adjustor means 52 located beneath the mirror.

The actuator position adjustor means 52 is mechanically fastened to a base 54 and includes a stepper motor 56 which, in the preferred embodiment, is connected to a reduction mechanism 58. Reduction mechanism 58 includes a solenoid (not shown separately) which may be selectively energized to engage a coupling 60 on a shaft 62 with a mating aperture 64 in the coupling end 28 of each actuator 16. Gear reduction mechanism 58 may be incorporated into the stepper motor to increase the angular resolution of the stepper motor. For example, angular resolution of 0.125° is possibly using a 120:1 gear reduction system coupled to a stepper motor 56 having a nominal resolution of 15° per step. As will be later described herein in greater detail, each actuator 16 may be positioned over the actuator position adjustor means 52 by means of the x-y table 40 and the actuator position adjustor means 52 may be used by selectively engaging the coupling 60 against an actuator 16 to permit the stepper motor 56 to adjust the position of the end 26 of the actuator 16 with respect to the retraction membrane 36 by rotating the actuator 16 in its threaded aperture 32.

The optical displacement sensor system 50 is positioned over the actuator position adjustor means 52 by suspending it from a frame 66. Preferably, the displacement sensor system 50 includes a light source 68, for example a superluminescent light emitting diode array containing one or more light emitting diodes, which is connected to a fiber optic bundle 70 and which emits light in the visible portion of the spectrum. The bundle 70 has an end portion 72 which comprises a fiber optical probe which is positioned above the mirror surface 14 and which is aligned over the actuator position adjustor means 52. A return portion 74 of the bundle 70 is optically connected to a photodetector array 76 which may include one or more photodetectors for converting light reflected from the reflecting surface 14 into an electrical signal. The output of the photodetector array 76 is electrically coupled to a controller 78.

FIG. 6 shows a cross-section of the fiber optic probe 72. The probe includes an array of fiber optic light transmitters 82 and an array of fiber optic light receivers 84. Each receiver fiber bundle 84 is concentric with a transmitter fiber bundle 82. Each of the transmitters 82 transmit light from the light source 68 to the reflecting surface 14 and each of the receivers 84 receive light reflected from the mirror surface 14 and transmit the received light to the photodetector array 76 via the return portion 74 of the fiber optic bundle 70. In the preferred embodiment, photodetector array 76 includes a photodetector (not shown) for each receiver 84 to convert the light received by each receiver 84 into an electrical signal whose magnitude is proportional to the light received by each receiver 84 from the mirror's reflecting surface 14. Light transmitted through the acceptance cone of each receiver bundle 84 is proportional to the distance between the respective transmitter 82 associated with the receiver 84, i.e. the transmitter 82 at the center of the particular receiver 84 and the reflecting surface 14 of the mirror 12. The spacing between each transmitter 82 and receiver 84 pair from adjacent transmitter 82 and receiver 84 pairs in the fiber optic probe 72 is preferably identical to the center-to-center spacing between adjacent actuators 16.

The photodetector array 76 generates a signal proportional to the distances between points on the mirror's reflecting surface 14 and each of the receivers 84 of the fiber optic probe 72. The output of each photodetector contained in photodetector array 76 is transmitted to the controller 78 Via the signal path 80. Preferably the controller 78, which may be a general purpose software programmable microcomputer such as a Compaq Model 386, includes a calibration table for each of the photodetectors in the photodetector array 76 to permit the absolute distance between the end of any receiver bundle 84 and the mirror's reflecting surface 14 to be computed based on the magnitude of the electrical signal generated by any photodetector within the array 76. The calibration table may be used to correct signals from individual photodetectors in the photodetector array 76 for non-uniform sensitivity between various of the photodetectors.

Controller 78 is connected to x-y table drivers 46 and 48 to control the location of the mirror 10 with respect to the probe 72 and the actuator position adjustor means 52. Controller 78 may either contain a memory with stored instructions or be driven by a software routine to selectively cause the drivers 46 and 48 to operate the position various of the actuators 16 between the center of the probe 72 and the adjustor means 52. For example, during the setup of a new mirror, controller 78 will contain instructions for control of the drivers 46 and 48 to sequentially position each of the mirror's actuators 16 beneath the center of the probe 72. In the case of the selective replacement or readjustment of one or more of the mirror's actuators 16, the controller 78 will receive instructions manually, for example from an operator, to selectively position the replaced actuators 16, or those in need of adjustment, together with adjacent actuators, between the center of the probe 72 and the adjustor means 52. For example, controller 78 can be provided with a table of the identification of each actuator 16 contained in a mirror 10 together with each actuator's location on the mirror's 10 reflecting surface 14. By instructing the controller 78 to position specifically identified actuators 16 under the center of probe 72, the controller 78 can retrieve the coordinates of the identified actuator 16 and selectively command the drivers 46, 48 to move the mirror 10 with respect to the probe 72 and adjustor means 52.

Controller 78 is also connected to the actuator position adjustor means 52 via the line 85. Controller 78 may generate instructions to energize the adjustor means 52 to engage the coupling 60 against aperture 64 in the actuator 16 positioned over the adjustor means 52. Thereafter, the controller 78 may control operation of the stepper motor 56 to control the extent that end 26 of the actuator 16 deflects the surface 14 of the reflecting mirror 12 by monitoring the output of the photodetector array 76 as the surface 14 is moved toward the probe 72 by the upward pressure of end 26 of the actuator 16 undergoing adjustment. It is apparent that the foregoing process could be repeated for each actuator 16 of a deformable mirror either being replaced or requiring calibration.

The foregoing method and apparatus for calibrating adjustable actuators in a deformable mirror has been described in a preferred embodiment. Variations of the described embodiment may become apparent to those skilled in the art after review of the disclosure contained herein. It is intended that the described embodiment be merely illustrative of the invention and that the invention be limited only by the permissible scope of the appended claims.

We claim:

1. An apparatus for adjusting force applied by replaceable actuators against the reflecting surface of a deformable mirror, said deformable mirror having a base with a plurality of threaded apertures for receiving said replaceable actuators, each of said actuators having a threaded portion to permit said actuators to be threaded into the threaded apertures in said base, said deformable mirror having a flat reflecting surface located above said base for reflecting optical signals therefrom, said apparatus including:

(a) an optical displacement sensor supported above the reflecting surface of said deformable mirror, said optical displacement sensor being capable of measuring the displacement between said reflecting surface and said optical displacement sensor for positions on said reflecting surface;

(b) means for supporting said deformable mirror beneath said optical displacement sensor and for moving said deformable mirror in a plane beneath said optical displacement sensor;

(c) means for selectively adjusting the positions of said actuators in said apertures;

(d) coupling means for selectively coupling said adjusting means to selected ones of said actuators; and (e) control means connected to said optical displacement sensor, to said coupling means and to said adjusting means, said control means selectively engaging said adjusting means through said coupling means to selected ones of said actuators to move said actuators in said apertures to effect a change in the distance between the reflecting surface of said deformable mirror and said optical displacement sensor;

whereby, the force applied by the actuators against the reflecting surface may be adjusted to control the shape of the reflecting surface of the deformable mirror.

2. The apparatus of claim 1 wherein said rotating means is a stepper motor.

3. The apparatus of claim 1 wherein said means for moving the deformable mirror includes an x-y table for supporting said deformable mirror and for moving said deformable mirror beneath said optical displacement sensor.

4. The apparatus of claim 3 wherein said control means includes means for controlling the movement of said x-y table to sequentially position said deformable mirror so that specific ones of said actuators are sequentially positioned between said coupling means and said optical displacement sensor.

5. The apparatus of claim 1 wherein said optical displacement sensor includes a source of light and means for directing said source of light toward the reflecting surface of said deformable mirror.

6. The apparatus of claim 5 wherein said means for directing said source of light toward said reflecting surface is a fiber optic light guide.

7. The apparatus of claim 5 wherein said optical displacement sensor includes means for receiving light reflected from said reflecting surface and means for converting the received light into an electrical signal.

8. The apparatus of claim 7 wherein the electrical signal generated by said means for converting the received light is proportional to the distance between the reflecting surface and said means for receiving light reflected from said reflecting surface.

9. The apparatus of claim 7 wherein said means for receiving light reflected from said reflecting surface is a fiber optic light guide.

10. The apparatus of claim 9 wherein said means for directing light toward said reflecting surface is concentric with said means for receiving light reflected from said reflecting surface.

11. The apparatus of claim 10 wherein said optical displacement sensor is comprised of a plurality of said means for directing light toward said reflecting surface and for receiving light reflected from said reflecting surface.

12. The apparatus of claim 11 wherein adjacent ones of said means for transmitting light toward said reflecting surface are spaced substantially the same distance from each other as the spacing between adjacent actuators in said deformable mirror 13. The apparatus of claim 11 wherein said means for converting light into an electrical signal generates more than one electrical signal, each of said signals being proportional to the distance between said means for receiving light from said reflecting surface and the reflecting surface beneath each of said means for receiving light.

14. The apparatus of claim 13 wherein the electrical signals generated by said means for converting light into an electrical signal are transmitted to said control means.

15. The apparatus of claim 14 wherein said control means senses the deflection imparted on said reflective surface by rotation of an actuator by said rotating means by monitoring the electrical signal generated by said means for converting received light reflected by said reflecting surface as said actuator is being rotated by said rotating means.

16. The apparatus of claim 15 wherein said control means includes means for terminating the rotation of an actuator by said rotating means when the reflecting surface beneath said optical displacement sensor is at a predetermined distance from said optical displacement sensor.

17. The apparatus of claim 16 wherein said means for terminating the rotation of an actuator consists of a memory containing a table of one or more distances between said reflecting surface and said optical displacement sensor to which the reflecting surface is to be adjusted, and means for correlating the output of said means for converting the light reflected from said reflecting surface with the table of distances stored in said memory.

18. A method for adjusting the position of one or more replaceable actuators in a deformable mirror having a facesheet with a reflecting surface on one side thereof for reflecting optical signals therefrom, retraction means coupled to said facesheet to retract said facesheet to a rest position after said facesheet has been selectively deformed by the operation of one or more of said actuators, said deformable mirror including a base having a plurality of apertures passing therethrough for receiving said replaceable actuators, each of said actuators having a front end intended to be placed in contact with said retraction means for exerting a force against said facesheet to selectively deform said reflecting surface, and a rear end having a threaded portion, each of said apertures in said base having a threaded portion for receiving the threaded portion of said actuators, said method comprising the steps of:

(a) threading an actuator into each of said apertures to a position such that the front end of each of said actuators does not contact said facesheet when said facesheet is in a rest position;

(b) positioning said deformable mirror on an x-y table beneath an optical displacement sensor to permit said x-y table to move said deformable mirror beneath said optical displacement sensor, said optical displacement sensor including means to measure the distance between said optical displacement sensor and the reflecting surface of said deformable mirror, said x-y table being positioned over actuator adjusting means for rotating said actuators in the apertures contained in the base of said deformable mirror as each of said actuators is positioned beneath said optical displacement sensor;

(c) using said optical displacement sensor to make measurements across the reflective surface of said deformable mirror as said deformable mirror is moved beneath said optical displacement sensor by said x-y table, (d) comparing the distance between said optical displacement and said reflective surface at a first location on said reflective surface beneath said optical displacement sensor with the distance between said reflective surface and said optical displacement sensor at locations adjacent to said first location;

(e) engaging said actuator adjusting means against said actuator closest to the first location on said reflective surface to rotate said actuator in its respective aperture until the distance between the optical displacement sensor and the reflecting surface at said first location is the same as the distance between said optical displacement sensor and the reflective surface at locations adjacent to said first location; and (f) repeating steps (a) through (e)

until all locations on said reflecting surface are equally spaced beneath said optical displacement sensor as said deformable mirror is moved under said optical displacement sensor by said x-y table.

19. The method of claim 18 wherein said optical displacement sensor, said x-y table and said actuator adjusting means are controlled by the controller, said controller controlling the movement of said x-y table to move said deformable mirror so that each of said actuators is sequentially moved beneath said optical displacement sensor.

20. The method of claim 19 wherein said actuator adjusting means includes a coupling controlled by said controller for selectively connecting each of said actuators to be adjusted to said actuator adjusting means.

* * * * *